United States Patent [19]

Canavesi et al.

[11] 4,401,631
[45] Aug. 30, 1983

[54] PROCESS FOR THE RECOVERY OF MOLYBDENUM FROM MIXTURES OF MOLYBDENUM COMPOUNDS WITH OTHER METALLIC COMPOUNDS

[75] Inventors: Roberto Canavesi, Bollate; Ferdinando Ligorati, Usmate; Roberto Ghezzi, Cusano Milanino; Roberto Clemente, Milan, all of Italy

[73] Assignee: Euteco Impianti S.p.A., Milan, Italy

[21] Appl. No.: 218,225

[22] Filed: Dec. 19, 1980

[30] Foreign Application Priority Data

Dec. 19, 1979 [IT] Italy .............................. 28223 A/79

[51] Int. Cl.$^3$ ............................................. C01G 39/00
[52] U.S. Cl. .............................. 423/54; 75/101 BE; 252/412
[58] Field of Search .................... 423/54; 75/101 BE; 252/412

[56] References Cited

U.S. PATENT DOCUMENTS

| 3,957,946 | 5/1976 | Ronzio et al. | 423/54 |
| 4,046,852 | 9/1977 | Vertes et al. | 423/54 |
| 4,079,116 | 3/1978 | Ronzio et al. | 423/54 |
| 4,145,397 | 3/1979 | Toida et al. | 423/54 |
| 4,199,551 | 4/1980 | Laferty et al. | 423/54 |

Primary Examiner—Herbert T. Carter
Attorney, Agent, or Firm—Sughrue, Mion, Zinn, Macpeak and Seas

[57] ABSTRACT

Recovery of molybdenum from a solid mixture, such as an exhausted catalyst, containing molybdenum in the oxide form or in the form of molybdic ions and other metallic compounds.

The mixture is contacted with an aqueous alkali metal hydroxide to solubilize molybdenum in the form of an alkali metal molybdate, and after filtration the aqueous solution of alkali metal molybdate thus obtained is contacted with a strong cationic exchange resin to convert said molybdate into molybdic acid.

5 Claims, No Drawings

PROCESS FOR THE RECOVERY OF MOLYBDENUM FROM MIXTURES OF MOLYBDENUM COMPOUNDS WITH OTHER METALLIC COMPOUNDS

The present invention relates to the separation and recovery of molybdenum from mixtures of molybdenum compounds with other metallic compounds.

Molybdenum compounds are largely used in the art, especially as components of hydrogenation catalysts or catalysts suitable for the oxidation of methanol to formaldehyde. The complete separation and recovery of molybdenum from such exhausted catalyst is therefore a practical problem of great importance, because of the high cost of molybdenum or for ecological reasons.

Various processes for the recovery of molybdenum compounds are known in the art. Thus, according to British Pat. No. 350,135, the mixtures of molybdenum or molybdenum compounds with other metals or metallic compounds, are treated with oxygen or a gas containing molecular oxygen at elevated temperatures and in general up to about 600° C., and the molybdenum oxides are then separated from the mixtures deriving from this treatment. Moreover, according to U.S. Pat. No. 3,538,017, the exhausted catalysts based on molybdenum and iron oxides are powdered and calcined, and the calcined powder is treated with aqueous ammonia, thereby to form a solution of molybdenum salt. From the solution thus obtained there is removed the ammonia in excess with respect to the quantity stoichiometrically necessary to form ammonium molybdate.

The processes of the known art present drawbacks deriving from the number and the cost of the operations required, and the recovery yields of molybdenum are often unsatisfactorily low. In each case, molybdenum is recovered in a chemical form which does not allow an easy conversion into the various compounds used in practice.

An object of the present invention is to overcome the drawbacks of the known art relating to the processes for the recovery of molybdenum from mixtures of molybdenum compounds with other metallic compounds.

In particular, an object of the invention is the recovery, in a useful form, of molybdenum from mixtures of molybdenum compounds with other metallic compounds, by a simple and economically convenient process which affords a practically quantitative recovery yield.

A specific object of the present invention is the recovery of molybdenum from exhausted catalysts used in the oxidation process of methanol to formaldehyde, which are formed, or consist essentially of molybdenum and iron oxides.

A further specific object of the invention is the recovery of molybdenum from exhausted hydrogenation catalysts, supported or non-supported, which contain molybdenum oxide in combination with one or more fully metallic oxides, especially cobalt and/or nickel oxide.

Further objects of the invention will result from the following description.

The invention provides a process for recovering molybdenum from a solid mixture containing molybdenum in the oxide form or in the form of molybdic ions and other metallic compounds, characterized in that said mixture is contacted with an aqueous solution of alkali metal hydroxide to solubilize molybdenum in the form of an alkali metal molybdate, the solid residue obtained is filtered off, the aqueous solution of alkali metal molybdate thus obtained is contacted with a strong cationic exchange resin to convert said molybdate into molybdic acid and the resulting aqueous solution of molybdic acid is recovered.

The molybdic acid thus obtained may then be converted into the desired salt by treatment with a suitable base.

Generally, any mixture containing molybdenum in the oxide form or in general in the form of molybdic ions, in addition to compounds of other metals which are left substantially unchanged in the alkaline attack or are converted into substantially insoluble compounds in said attack, may be treated according to the present invention.

The solid to be treated may consist essentially of metallic compounds, such as oxides, or may also contain non metallic compounds substantially inert under the alkaline attack conditions. The process of the present invention is particularly suited to the recovery of molybdenum from exhausted catalysts which contain molybdenum oxide in combination with other metallic oxides. Examples of such catalysts are those suitable for the oxidation of methanol to formaldehyde, which are formed of molybdenum oxide and iron oxide, and which possibly contain minor amounts of cobalt or nickel, still in the form of oxides. Catalysts of this type are described for example in U.S. Pat. No. 1,913,405, Canadian Pat. No. 619,043, U.S. Pat. No. 3,459,807, Belgian Pat. No. 601,600 and U.S. Pat. No. 3,464,931.

Other examples of such catalysts are those suitable for hydrogenation, which are formed of molybdenum oxide in combination with cobalt and/or nickel oxide, generally supported on an inert carrier, for example on alumina. Reference is made for example in respect of these last catalysts to the hydrogenation processes described in U.S. Pat. Nos. 3,478,121 and 3,551,511.

The exhausted catalysts treated according to the process of the present invention are preferably ground to reduce them into a powder with a size of the order of 300 microns.

Sometimes, a thermal treatment of such powders has proved to be useful, and thus, for example, in the case of catalysts supported on alumina, a heating at 900°–1000° C. for a period of the order of one or several hours, makes said alumina unattackable or substantially unattackable by the alkali metal hydroxide.

The exhausted catalyst, ground and possibly heated, is treated with an aqueous solution of an alkali metal hydroxide. Preferably, there is used to this end aqueous sodium hydroxide, with a concentration of from 2 to 15% by weight. The attack is preferably carried out at ambient temperatures (20°–25° C), or in general without any supply of heat from external sources. It is possible, however, to operate at temperatures higher than ambient, for example up to 70° C. By operating under these conditions and for a period of the order of 1–4 hours, molybdenum is solubilized in the form of alkali metal molybdate, while the other metals, such as iron, cobalt and nickel precipitate in the form of hydroxides. Therefore, the quantity of alkali metal hydroxide used will be at least equal to that stoichiometrically necessary for the formation of alkali metal molybdate and for the precipitation of the other metals in the form of hydroxides. Conveniently, the pH is maintained at values of from 9.5 to 13 during the attack. The hydroxides are removed by filtration of centrifuging, and possibly washed with water.

The solution remaining after the filtration, possibly combined with the washing waters, is contacted according to the present invention with a strong cationic exchange resin in the acid from, called also hydrogen form.

Suitable strong cationic exchange resins are those which carry sulphonic of methylenesulphonic acid groups. Among the latter, the most important are the exchange resins obtained by sulphonation of polystyrene cross-linked with divinylbenzene.

The exchange resins suitable for the purposes of the present invention generally have an exchange capability of from 1 to 3, expressed in equivalents per liter of resin. Examples of suitable commercial resins are DUOLITE C 264 and DUOLITE C 265 (of the Chemical Process Company), AMBERLITE IR 124 (of the Rohm & Haas Company) and similar.

According to a preferred embodiment of the present invention, the resin is arranged in the form of a fixed bed, and upon possible conditioning and treatment for the conversion into the acid form, the aqueous solution of sodium molybdate is percolated through the bed. Typically, said aqueous solution has a concentration of sodium molybdate of from 2 to 20% by weight and is fed to the exchange resin at a rate of from 0.5 to 3 volumes per volume of resin and per hour. Typically, operation is at ambient temperature (20°–25° C.), even if it is possible to use a broader temperature range, such as for example from 10° to 80° C.

By operating under these conditions, there is obtained an aqueous solution of molybdic acid, utilizable as it is or after conversion into the desired salt by treatment with a suitable base. After washing with water and treatment with an acid (sulphuric, hydrochloric or similar acid) for the regeneration to the acid form, the resin is ready for a new operation cycle.

Therefore, by means of the process of the present invention, molybdenum is recovered in the form of molybdic acid in a simple and economically convenient manner.

The process of the present invention comprises a simple percolation of an aqueous solution of an alkali metal salt of molybdic acid (generally sodium molybdate) through a strong cationic resin in the hydrogen form. By means of said percolation there are obtained strongly acidic solutions, slightly blue in colour (molybdenum blue), which may reach very high concentrations (of the order of 80 g/l, expressed as metallic molybdenum). These solutions, which have a very acid pH value (of the order of 1.5) are very stable in time and may be used for the preparation of any desirable molybdates. It should also be noted that said solutions, depending on the pH which is reached therein by the addition of a base, may yield the various molybdenum polyacids.

To determine the molybdenum content of the solutions obtained according to the present invention, there was used the titration method with solutions having a known content of sodium hydroxide. By using a pH-meter for the titration, it was possible to determine the neutralization points for the two hydrogens of the acid.

The following Examples are illustrative and non-limitative for the invention. In said Examples there is used a strong cationic exchange resin, commercially known under the name DUOLITE C 264 (of the Chemical Process Company) and having the following characteristics: the matrix consists of macroporous polystyrene cross-linked with divinylbenzene, carrying sulphonic groups —$SO_3H$, the size of the resin granules is in the range 0.3–1.2 mm and its exchange capability is about 2.5 equivalents per liter.

Before its use, the resin is conditioned and converted into its hydrogen form by means of the following process:

(1) Conditioning in deionized water for 10–15 hours and subsequent washing, still with deionized water, to prepare the resin bed;

(2) treatment with a strong acid (such as HCl, $H_2SO_4$, $HNO_3$) in aqueous solution with an acid concentration in the range 2–40% by weight, at a rate of 2–8 volumes of acid solution per volume of resin and per hour;

(3) washing with deionized water until the pH is neutral, at a rate of 10–20 volumes of water per volume of resin and per hour.

After the utilization, the regeneration of the resin to the hydrogen form is carried out by repeating the treatments (2) and (3) indicated above.

EXAMPLE 1

Molybdenum is recovered from an exhausted catalyst used in the oxidation of methanol to formaldehyde, and consisting of molybdenum, iron and cobalt oxides with 81.5% by weight of molybdenum oxide.

The catalyst under discussion is ground to reduce it into a powder with a size of the order of 300 microns, and the powder is dried by heating at 200° C. for two hours.

300.2 g of the dried powder are treated with 1132 g of an aqueous solution containing 12% by weight of sodium hydroxide. The whole is maintained into contact under agitation for two hours at ambient temperature (20°–25° C.). The solid residue is then filtered off and washed. There are thus recovered 1400 ml of aqueous solution containing 163 g of molybdenum, expressed as metal. The solid residue, weighing 55.5 g, is essentially formed of iron and cobalt hydroxides. The solution thus obtained is percolated through 4 liters of exchange resin in acid form as defined above, at a rate of 1 volume of solution per volume of resin and per hour. At the end of the percolation, the column is washed with deionized water and the percolated solution and washing waters are combined. There are thus obtained 4 liters of aqueous solution of molybdic acid containing about 41 g/l of molybdenum. The overall yield for the recovery of molybdenum is thus equal to 100%.

The molybdic acid thus obtained is converted into ammonium paramolybdate, which is used as starting material for the preparation of catalysts for the oxidation of methanol to formaldehyde.

EXAMPLE 2

Operating as in Example 1, there are used 328 g of the catalyst ground and dried. The attack of the powder is carried out with 1237.6 g of aqueous sodium hydroxide with a concentration of 12% by weight. After separation and washing of the solid residue, there are recovered 1500 ml of a sodium molybdate solution containing 178.1 g of molybdenum.

The solution is percolated through 4 liters of the resin regenerated after its use according to Example 1, at a rate of 1 volume of solution per volume of resin and per hour. At the end of the percolation, the column is washed with deionized water and there is obtained a total amount of 5 liters of aqueous solution of molybdic acid containing 35.6 g/l of molybdenum, expressed as metal. The percolation and washing operations are carried out at ambient temperature (20°–25° C.). The overall yield for the recovery of molybdenum is equal to 100%.

The molybdic acid solution thus obtained was stored in a cold container made of transparent glass and exposed to light. After 3 months of storing the solution did not show any alteration.

EXAMPLE 3

By operating as in Example 1, there are used 304.1 g of catalyst dried and ground. The attack of the powder is carried out with 1147.5 g of aqueous sodium hydroxide with a concentration of 12% by weight. After separation and washing of the solid residue, there are obtained 1400 ml of sodium molybdate solution containing 165.15 g of molydbenum.

The solution is percolated through 4 liters of resin regenerated after its use according to Example 2, at a rate of 1 volume of solution per volume of resin and per hour. At the end of the percolation the column is washed with deionized water, and there is recovered a total amount of 4.5 liters of aqueous solution of molybdic acid containing 36.7 g/l of molybdenum, expressed as metal. The percolation and washing operations are carried out at ambient temperature (20°–25° C.).

The overall yield for the recovery of molybdenum is equal to 100%. The molybdic acid solution is treated with aqueous ammonia, and the ammonium molybdate thus obtained is used in the preparation of a hydrogenation catalyst based on molybdenum and cobalt oxides supported on alumina.

EXAMPLE 4

There are prepared 500 ml of aqueous solution of sodium molybdate containing 50 g of molybdenum, according to the procedure described in Example 1. This solution is percolated through 1.5 liters of the aforesaid strong cationic exchange resin in the hydrogen form. At the end of the percolation, a washing with deionized water is carried out, and there is recovered a total amount of 2 liters of aqueous solution containing substantially the whole of the initial molybdenum in the form of molybdic acid. One liter of aqueous solution containing 127.3 g of barium chloride dihydrate is added to the acid solution.

There is thus obtained a precipitate of barium molybdate, which is recovered in a quantity of 154.7 g. The residual solution contains 0.15 g of barium molybdate.

EXAMPLE 5

Operating as in Example 4, there is added to the solution obtained by percolation and washing of the resin, one liter of aqueous solution containing 57.8 g of calcium chloride. A precipitate formed of 102.5 g of calcium molybdate separates, and the residual solution contains 1.5 of calcium molybdate.

EXAMPLE 6

Operating as in Example 4, there is added to the solution obtained by percolation and washing of the resin, 500 ml of a solution containing 15.6 g of ammonium hydroxide, and 500 ml of aqueous solution containing 50.6 g of ferric chloride hexahydrate are added to the resulting solution.

After filtration and separation of the precipitate, there are recovered 89.6 g of iron molybdate. The residual solution contains 3.44 g of iron molybdate.

EXAMPLE 7

The run of Example 6 is repeated with the differences that 500 ml of aqueous solution containing 54.5 g of barium chloride dihydrate are added in lieu of the ferric chloride solution. 109.2 g of barium paramolybdate precipitate are recovered.

EXAMPLE 8

Molybdenum is recovered from a catalyst formed of 12% by weight of molybdenum oxide and 4.0% by weight of cobalt oxide on an alumina support. 10 g of this catalyst, reduced into a powder with a size of the order of 300 microns, are treated with 200 g of 12 wt. % aqueous sodium hydroxide.

The mass is kept under agitation for four hours at ambient temperature (20°–25° C.) and the residual solid is filtered off. There are recovered 170 ml of a solution of sodium molybdate containing 4.2 g/l of molybdenum and 790 mg/l of aluminium.

EXAMPLE 9

The run of Example 8 is repeated with the difference that the catalyst powder is calcined in an oven for 2.5 hours at 900° C. The aqueous solution of sodium molybdate contains 4.2 g/l of molybdenum and 45.5 mg/l of aluminum, expressed as metal. Molybdic acid is recovered from this solution in the manner already shown.

We claim:

1. A process for recovering molybdenum from an exhausted catalyst selected from the group consisting of
    (a) catalysts for the oxidation of methanol to formaldehyde, formed of molybdenum and iron oxides and containing at most minor amounts of cobalt or nickel oxide and
    (b) hydrogenation catalysts formed of molybdenum and cobalt and/or nickel oxide, unsupported or supported on an inert carrier, which comprises
    (1) contacting said exhausted catalyst with an aqueous solution of sodium hydroxide having a concentration of from 2 to 15% by wt. at a temperature of from ambient temperature to 70° C., for a period from 1 to 4 hours and at pH of from 9.5 to 13 to solubilize molybdenum in the form of sodium molybdate,
    (2) filtering off the solid residue obtained from the aqueous solution present,
    (3) percolating the aqueous solution thus obtained in step (2) having a content of from 2 to 20% by wt. of sodium molybdate through a strong cationic exchange resin to convert said molybdate in said aqueous solution into molybdic acid and
    (4) recovering the resulting aqueous solution of molybdic acid of step (3).

2. The process of claim 1, wherein said strong cationic exchange resin has a matrix formed of polystyrene cross-linked with divinylbenzene and carrying sulphonic or methylene-sulphonic groups, and has an exchange capability of from 1 to 3 equivalents per liter of resin.

3. The process of claim 1, wherein said aqueous solution containing said sodium molybdate of step (3) is percolated through said strong cationic exchange resin at a rate of from 0.5 to 3 volumes per volume of resin per hour and at a temperature of from 10° to 80° C.

4. The process of claim 3, wherein said percolation is carried out at ambient temperature.

5. The process of claim 1, wherein said aqueous solution of molybdic acid of step (4) is treated with a base suited to the conversion of molybdic acid into the desired molybdate.

* * * * *